US012651511B2

(12) United States Patent
Marks et al.

(10) Patent No.: US 12,651,511 B2
(45) Date of Patent: Jun. 9, 2026

(54) GAME PRESENTATION INCLUDING MULTIPLE LINKED AWARDS

(71) Applicant: Aristocrat Technologies, Inc., Las Vegas, NV (US)

(72) Inventors: Daniel Marks, Decatur, GA (US); Hua Xu, Marietta, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 18/467,567

(22) Filed: Sep. 14, 2023

(65) Prior Publication Data

US 2024/0005742 A1 Jan. 4, 2024

Related U.S. Application Data

(63) Continuation of application No. 17/349,294, filed on Jun. 16, 2021, now Pat. No. 11,790,732.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/323* (2013.01); *G07F 17/3244* (2013.01); *G07F 17/3239* (2013.01); *G07F 17/34* (2013.01)

(58) Field of Classification Search
CPC ............. G07F 17/3267; G07F 17/3213; G07F 17/323; G07F 17/3244; G07F 17/3239; G07F 17/34
See application file for complete search history.

(56) References Cited

U.S. PATENT DOCUMENTS

| | | | | |
|---|---|---|---|---|
| 5,584,763 | A * | 12/1996 | Kelly | A63F 5/04 463/16 |
| 6,095,921 | A | 8/2000 | Walker | |
| 8,460,092 | B1 * | 6/2013 | Slomiany | G07F 17/326 463/19 |
| 2003/0050111 | A1 * | 3/2003 | Saffari | G07F 17/3255 463/25 |
| 2005/0236774 | A1 * | 10/2005 | Loewenstein | G07F 17/32 273/303 |
| 2006/0116208 | A1 | 6/2006 | Chen | |
| 2008/0026831 | A1 * | 1/2008 | Wright | G07F 17/3281 463/26 |

(Continued)

OTHER PUBLICATIONS

Office Action dated Mar. 28, 2022 for U.S. Appl. No. 17/349,294 (pp. 1-21).

(Continued)

*Primary Examiner* — Jeffrey K Wong
(74) *Attorney, Agent, or Firm* — Armstrong Teasdale LLP

(57) ABSTRACT

A gaming machine and method, in which a multiple option trigger condition present in a game instance outcome results in a further determination of possible awarding of one or more prizes from multiple hierarchical tiers of prizes. Determinations as to awarding prizes from one or more of the hierarchical tiers can result automatically from the multiple option trigger condition; and different multiple option trigger conditions can be present in the outcome which can result in different methods of determining what prizes, if any, will be awarded from the multiple hierarchical tiers of prizes.

17 Claims, 10 Drawing Sheets

(56) References Cited

U.S. PATENT DOCUMENTS

| | | | | |
|---|---|---|---|---|
| 2008/0045324 | A1 | 2/2008 | Kato | |
| 2008/0146346 | A1* | 6/2008 | Hardy | G07F 17/329 463/16 |
| 2009/0124371 | A1* | 5/2009 | Gilmore | G07F 17/3258 463/27 |
| 2009/0270163 | A1* | 10/2009 | Mitelman | G07F 17/32 463/20 |
| 2014/0335934 | A1* | 11/2014 | Meyer | G07F 17/3267 463/20 |
| 2015/0072770 | A1* | 3/2015 | Simongini | G07F 17/3244 463/25 |
| 2016/0055718 | A1* | 2/2016 | Lyons | G07F 17/3258 463/27 |
| 2020/0074791 | A1* | 3/2020 | Uberuaga | G07F 17/3267 |
| 2020/0312086 | A1 | 10/2020 | Kendall | |
| 2020/0312087 | A1 | 10/2020 | Kendall | |
| 2020/0312095 | A1 | 10/2020 | Kendall | |
| 2021/0065519 | A1* | 3/2021 | Uberuaga | G07F 17/3267 |

OTHER PUBLICATIONS

Office Action dated Oct. 5, 2022 for U.S. Appl. No. 17/349,294 (pages1-24).

Office Action (Notice of Allowance and Fees Due (PTOL-85)) dated Jun. 14, 2023 for U.S. Appl. No. 17/349,294 (pp. 1-10).

* cited by examiner

GAME PRESENTATION INCLUDING MULTIPLE LINKED AWARDS

CROSS-REFERENCE TO RELATED APPLICATIONS

This application is a continuation of and claims the benefit of U.S. patent application Ser. No. 17/349,294, filed Jun. 16, 2021, the contents of which are hereby incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Embodiments include a gaming system, a method, and a non-transitory medium containing instructions for performing operations; in which a multiple option trigger condition present in a game instance outcome results in a further determination of possible awarding of one or more prizes from multiple hierarchical tiers of prizes. In selected embodiments, this further determination is made after the game instance outcome, and in the absence of a further user input. As described herein, the determination of awarding prizes from one or more hierarchical tiers can be performed through and decide how dark it looks outside alternative and distinct implementations, using alternative data structures, and/or calls to a random number generator. In selected embodiments, different multiple option trigger conditions can be present in an instance outcome which can result in different methods (utilizing different stored data structures) for determining what prizes, if any, will be awarded from the multiple hierarchical tiers of prizes.

In a first example, a gaming system includes a user interface system configured for receiving an indication to initiate one or more instances of a slot game; a display system comprising one or more displays; and a control system comprising one or more processors. The control system may be configured to execute instructions which cause the control system to perform operations comprising: presenting a game instance; determining an instance outcome including display symbols selected from a symbol set; in response to determining the instance outcome, controlling the display system to display the display symbols associated with the instance outcome; and determining that a multiple option trigger condition is present in the outcome. In this first embodiment, in response to the multiple option trigger condition, the control system will determine any prizes to be awarded from one or more of multiple hierarchical tiers of prizes, wherein each hierarchical tier as one or more award values, increasing from a lowest value tier to a highest value tier. In this embodiment, each tier may be awarded individually, or in common with an award of a higher value tier. In response to determining that one or more eligible prizes determined responsive to the multiple option trigger condition are to be awarded, the display system will be controlled to further display an indication of the one or more prizes awarded.

A further embodiment includes a gaming method, including presenting a game instance on a gaming machine having, a controller; a non-transitory storage media accessible by the controller, the storage media retaining one or more data structures; and a display system. An instant outcome will be determined including display symbols selected from a respective symbol set comprising configurable symbols and non-configurable symbols, wherein the instance outcome comprises a multiple option trigger condition. In response to the multiple option trigger condition, a determination is made as to prizes to be awarded from at least three hierarchical tiers of prizes by correlating a result of a random number generator (RNG) call with a first data structure stored in the non-transitory storage media, the first data structure associating probabilities of awarding prizes from each of at least three hierarchical tiers of prizes; and in response to determining that one or more eligible prizes determined responsive to the multiple option trigger condition is to be awarded, the display system is controlled to further display an indication of the one or more prizes awarded.

Yet another example embodiment includes one or more non-transitory media including software stored thereon, the software including one or more data structures and instructions for controlling one or more devices to perform a method, comprising: wherein the instructions, when executed by one or more processors, result in the performing of operations, comprising: presenting a game instance determining an instance outcome including display symbols selected from a respective symbol set comprising configurable symbols and non-configurable symbols, wherein the instance outcome comprises a multiple option trigger condition; in response to the multiple option trigger condition, initiating a single random number generator (RNG) call to an RNG engine; and correlating a result of the single RNG call with a first data structure stored in the non-transitory media, the first data structure establishing probabilities of awarding each prize of all tiers of multiple hierarchical tiers of prizes and for each awardable combination of prizes from the multiple tiers of prizes.

DETAILED DESCRIPTION

Figure 1:
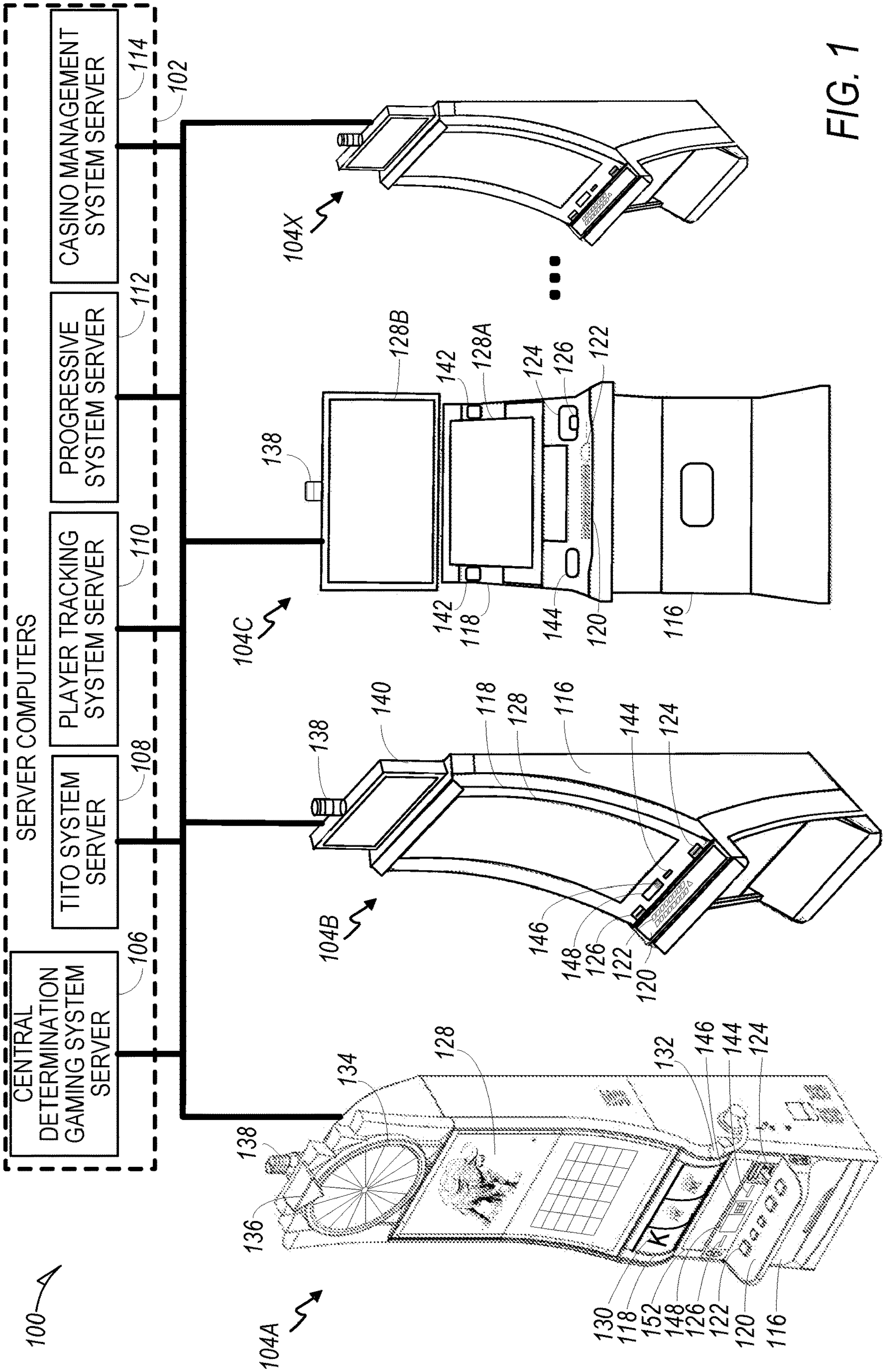
FIG. 1 is an exemplary diagram showing several EGMs networked with various gaming related servers.

The present description addresses gaming devices and processes for their operation, and includes devices and processes, in which a single instance of a game may include an initial outcome including a multiple option trigger in which additional determinations will be made of one or more prizes that may be eligible to be awarded, and for which the instance will include determining whether those eligible prizes will be awarded to the player. In some examples, prizes may be selected to be eligible for award and/or awarded in a hierarchical order. For example, if a first level prize is determined to be eligible for award (such as, for example a Minor jackpot, or a 2× multiplier), then a second level prize will be considered for award (for example, a Major jackpot or a 3× Multiplier); wherein consideration of the second level prize is contingent on the first level having been determined to be eligible. In other examples, multiple levels of prizes will be independently considered for award (for example, each of Minor, Major, and Grand jackpots; or various value multipliers), either individually or in combination with one another.

A problem exists in such multiple option systems and how to control RTP, a problem which exists particularly in systems in which not only variables of machine-specific game play are present in determining RTP; but in which RTP may also impacted by potential prizes (such as jackpot values), established externally to the individual gaming machine. Additionally, determinations will beneficially be made in a manner which imposes relatively reduced processing demands on the gaming machine and/or gaming network. Accordingly, in particular embodiments, data structures may be configured to reduce processing demands to determine eligible tiers of awards, and to award any prizes from the eligible tiers, while still maintaining a target RTP. Determinations as to multiple possible prizes can be facilitated through data structures, such as one or more weighted tables, accessed through RNG calls, to provide a desired RTP. In one solution to this problem, discussed later herein, all possible tiers of awards, individual prizes, and potential combinations of individual prizes from such tiers may be represented in association with relative probabilities in a single data structure (such as a single weighted table). In such an example, one or more prize awards may be determined in response to a single RNG call correlated with the data structure. This solution, using a single data structure for all potential prize awards, also facilitates modification, as may be beneficial in some environments to modify or adapt RTP. In other examples, dependent for example on the number of applicable tiers of prizes and the number and/or type of prizes in each tier (for example, jackpot awards versus multiplier awards), greater efficiencies may be obtained by making determination(s) of available tiers of a hierarchical arrangement in reference to correlating a first RNG call to a first data structure, and making a selection of prizes from the available tier(s) in reference to a second RNG call correlated with a second data structure.

Another problem exists in communicating operations of the game to a player when the player is not providing further inputs to the system. The described potential awards linked to the one or more multiple option triggers in an outcome, extend the activity in a game instance without requiring intervention by a player. In place of an instance ending with display of an array of symbols in a game outcome, the play is extended by randomly determining (through RNG calls) additional prizes that may be awarded, to provide unexpected potential, and in some cases actual, benefits to the player. Such additional RNG calls and consideration of additional prizes, do not normally occur after a game instance outcome. A problem therefore exists with such continued play addressing multiple potential prizes in multiple hierarchical tiers without player inputs (selections), as the player may not understand the various prizes eligible for award or awarded. As described herein, to address this problem, in some examples, metamorphic graphic elements may be presented to inform the player of the potential and awarded prizes not contained within the symbol array of the instance outcome. As described in more detail later herein, various forms of metamorphic graphic elements may be used to identify a representation of hierarchical tiers of prizes, and in some examples of eligibility of selected tier/prizes for award.

In some embodiments, events in the gameplay, including the identification of prizes determined to be eligible for award and/or the award of individual prizes can be communicated to the player at least in part through a metamorphic graphic image. In some examples, one or more objects may be moved to graphic destinations depicted on the screen and correlating to potential prizes. In other examples, graphic destinations depicted on the screen may be associated with increments to the value of a respective jackpot, which in some implementations may be one of the potential prizes obtainable through the multiple option trigger. Additional problems and the solutions thereto will be apparent from the following discussion of example implementations.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
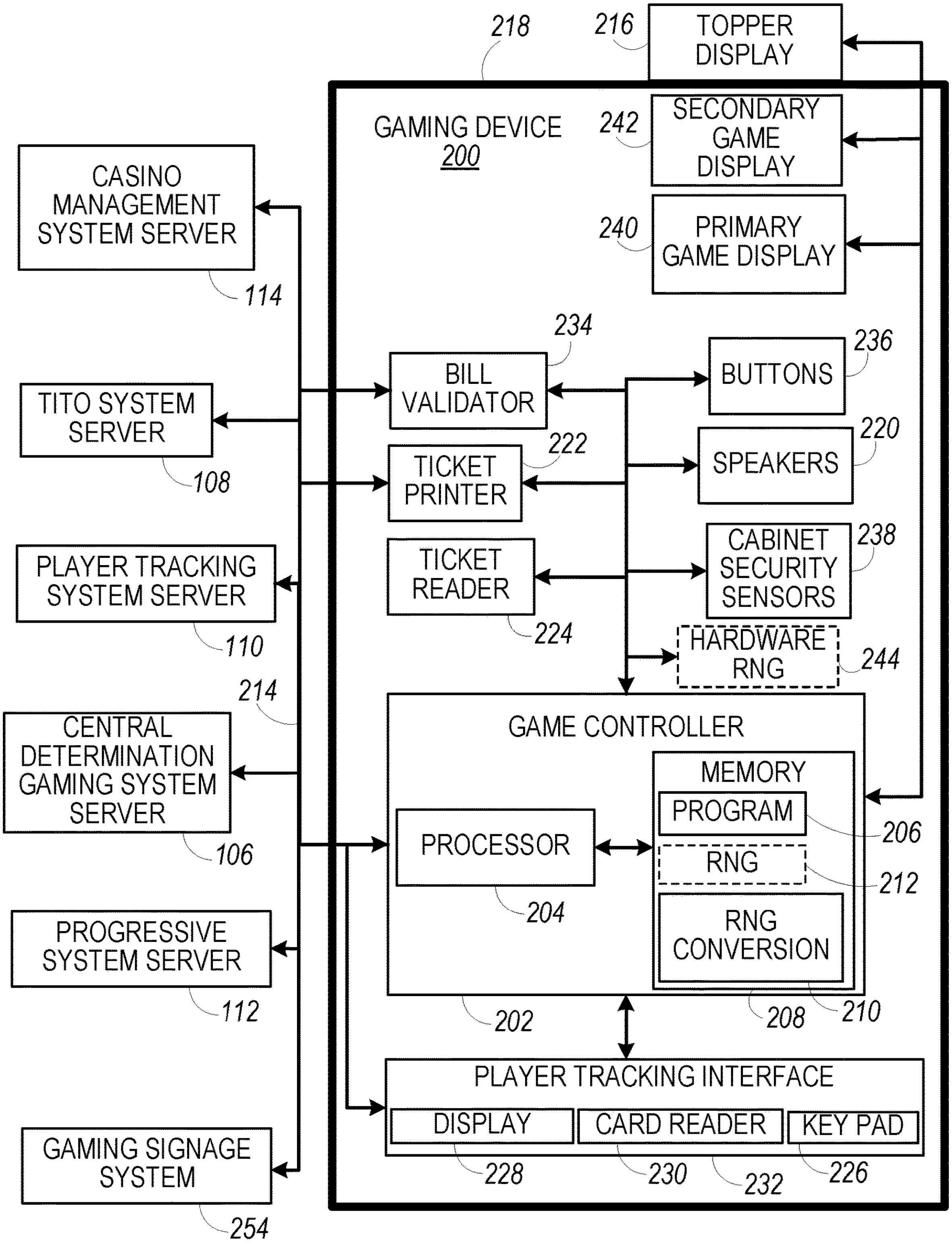
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Additionally, memory 208 may store lookup tables or other reference structures to determine game instance outcomes (as described in more detail in the following discussion), including to identify one or more multiple option trigger conditions in an instance outcome, and to make the related determination(s) as to which potential prizes would be eligible for award to a player in response to the multiple option trigger conditions; and further determine which of the eligible prizes would be awarded. In some implementations either or both determinations will be performed in response to one or more RNG calls. Additionally, memory 208 may include a data structure, such as the identified lookup table, for example, that may be referenced by a game controller (or in some examples, a UI system) to determine events relative to a multiple option trigger condition (for example, the determination of eligible prizes) that functions as a graphic trigger condition to initiate display of one or more graphic objects to convey the event to a player.

In an example, memory 208 of game controller 202, may further store one or more data structures that may be used to generate metamorphic graphic elements as described herein. The stored data structure may include, in some examples, a 2D or 3D bitmap of the movable graphic object(s) (as sometime referred to as a "sprite") and/or other graphic representations. In other examples, the stored data structure may contain data representative of properties and characteristics of these metamorphic graphic elements in accordance with a graphics rendering application programming interface (API), for example, Open GL, for use in 2D or 3D graphics rendering. In some examples, the stored data structures may be accessed by a UI system (302 in FIG. 3); or in other examples may be stored in memory located within or dedicated to a UI system.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

The lookup tables, in the form of weighted tables, can have one of many possible configurations. In general, a weighted table can be implemented as any data structure that assigns probabilities to different options, in order for one of the different options to be selected using a random number. Different options are represented in different entries of a weighted table. For example, there may be multiple possible values within each tier of the weighted table, and the multiple possible values may be unequally weighted. The probabilities for different options can be reflected in threshold values (e.g., 1<RND<=40 for option 1, 40<RND<=70 for option 2, 70<RND<=90 for option 3, and 90<RND<=100 for option 4, given four options and a random number RND where 0<RND<=100). The threshold values can represent percentages or, more generally, subranges within the range for a random number. In some example implementations, the threshold values for a weighted table are represented as count values for the respective entries of the weighted table. For example, the following table shows count values for the four options described above:

TABLE 1

Example Weighted Table

| count value | entry |
|---|---|
| 40 | <value a1, value a2, . . . > |
| 30 | <value b1, value b2, . . . > |
| 20 | <value c1, value c2, . . . > |
| 10 | <value d1, value d2, . . . > |

The sum total of the count values indicates the range of the options. Control logic can use a random number, generated between 1 and the sum total of the count values, to select one of the entries in the weighted table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected.

The threshold values for a weighted table can be fixed and predetermined. Or, the threshold values for a weighted table can vary dynamically (e.g., depending on bet level). Or, a weighted table can be dynamically selected (e.g., depending on bet level) from among multiple available weighted tables. Different parameters or choices during game play can use different weighted tables. Or, different combinations of parameters or choices can be combined in entries of a given weighted table.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may award players in a loyalty program. The player may use the player tracking interface 232 to access his/her account information, activate free play, and/or request various information. Player tracking or loyalty programs seek to award players for their play and help build brand loyalty to the gaming establishment. The awards typically correspond to the player's level of patronage (e.g., to the player's playing frequency and/or total amount of game plays at a given casino). Player tracking awards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
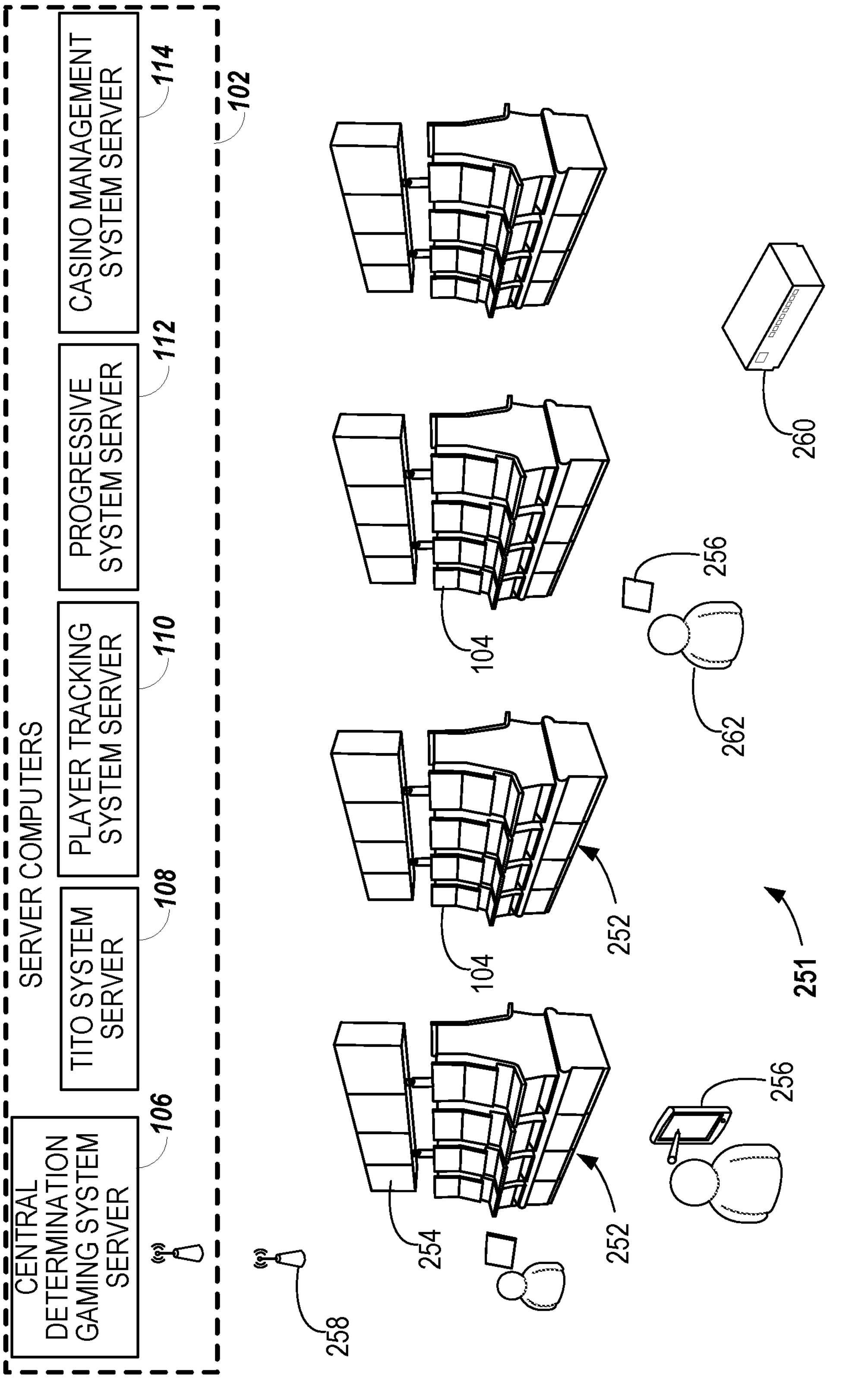
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash-in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
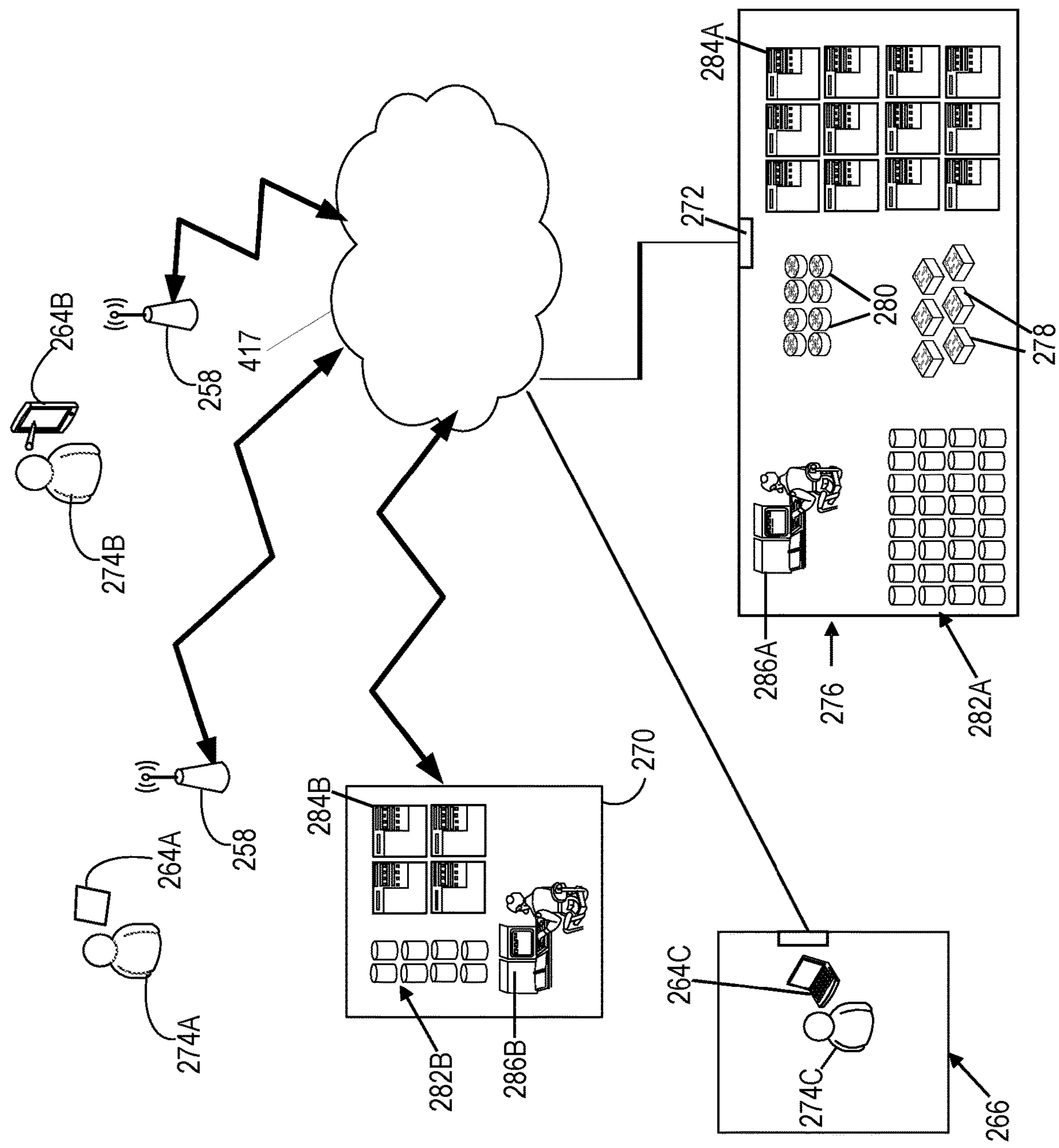
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash-in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
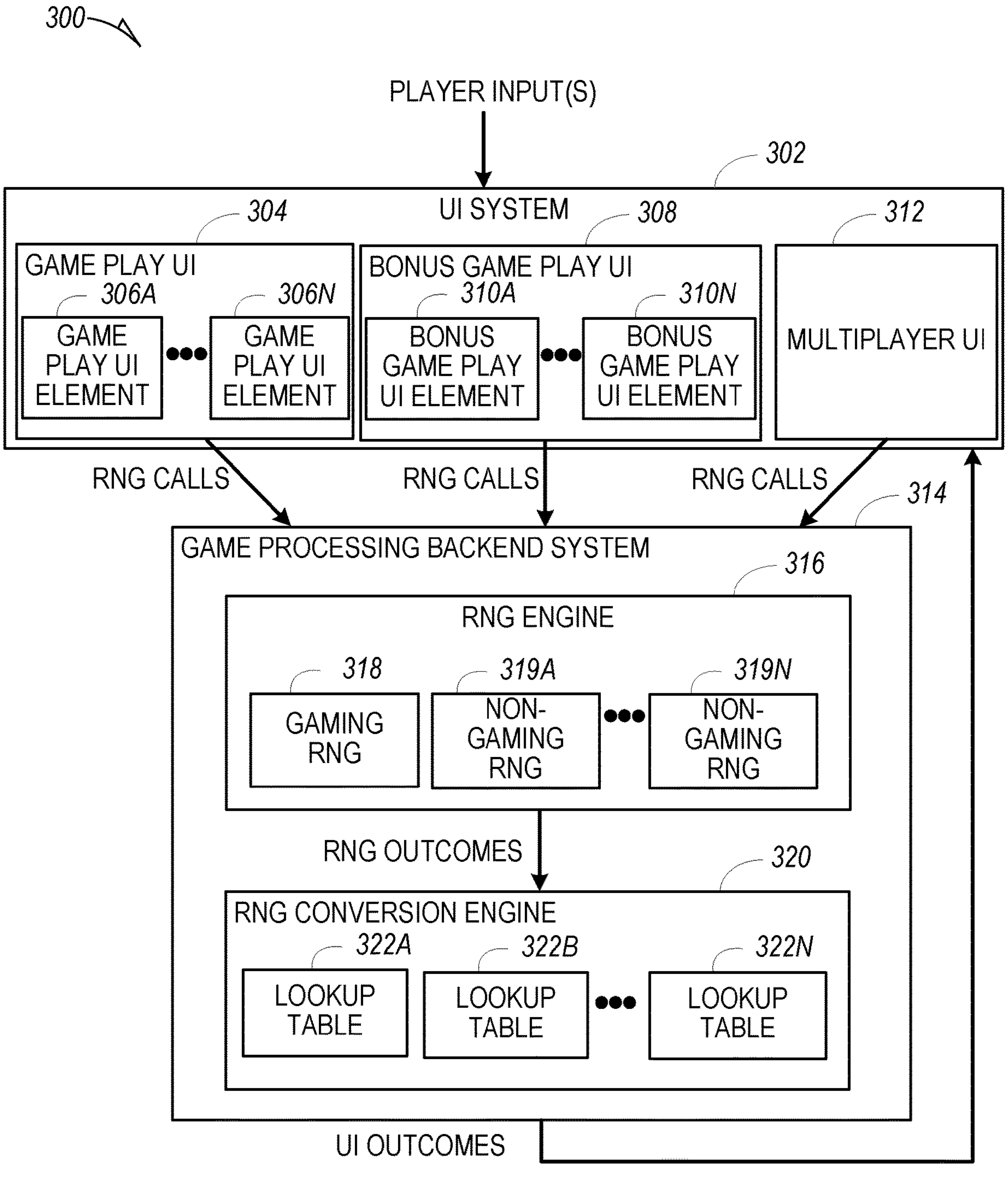
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is fed back to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
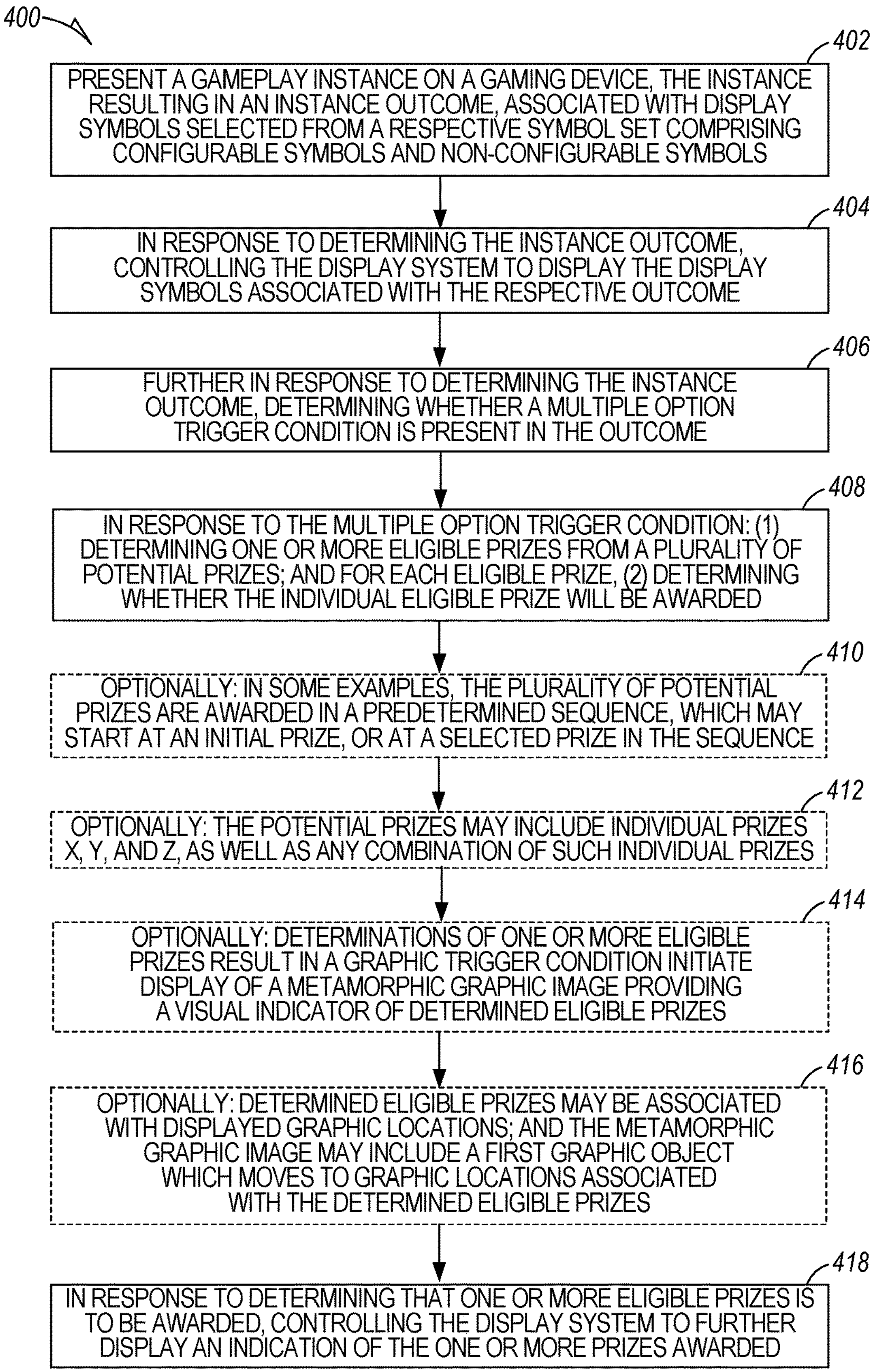
FIG. 4 depicts an example process for controlling a gaming.

Referring now to FIG. 4, the figure depicts an example process for controlling a display system during gameplay as may be implemented, for example, on a gaming device (such as 200 of FIGS. 2A-C) through use of a game processing architecture (such as 300 of FIG. 3). The described display system control process may be implemented, as desired, in association with play of a base game, and/or one or more bonus or feature games, as may commonly be offered in association with a base game. As is known to persons skilled in the art, play of a base game on a gaming device 200 may typically be initiated after a player establishes a credit value on the gaming device, such as through a credit input mechanism or device, such as the ticket reader 224 or bill validator 234, of the gaming device 200. In response to the received physical item, the gaming device 200 may increase a credit value of a credit meter displayed to a user based on the monetary value of the physical item. Subsequently, the gaming device 200 will receive a wager of a selected amount being funded by the credit value of the credit meter. After establishing the credit value the gaming device 200 may receive a wager from the player; and a player will commonly initiate at least a first instance of the base game. In many examples, each instance of a base game may include an opportunity for the player to change the amount of the wager and to initiate the subsequent instance.

In some examples, during, or as a result of, play or outcomes of the base game one or more forms of feature games may be awarded. An awarded feature game may be selected from multiple potential game formats which may be awarded. The awarded feature game may be determined randomly, or in response to an instance outcome of the base game, or in response to multiple instance outcomes of the base game. Additionally, a subsequent feature game may be triggered during or in response to a previously-awarded feature game.

The example process for controlling the display system may be implemented during a base game and/or during any one or more feature games. For purposes of the present description, the games will be described in an example configuration of a spinning reel game including multiple reels, wherein the gaming device 200 may stop the reels based on one or more random values generated by RNG 212 to obtain a base game outcome comprising a matrix, or any other formation or arrangement, of symbols. In other embodiments, the gaming device 200 may stop the reels based on information received from central determination gaming system server 106, or using a bingo game outcome. In some examples, the spinning reel game may be a "hold and spin" game in which configurable symbols having an associated value which appear in an instance outcome may be retained in their displayed position and included in determining subsequent instance outcomes.

Referring further to FIG. 4, an example process 400 may be implemented, as indicated in 402, to present a gameplay instance on a gaming device comprising determining an instance outcome including symbols selected from a symbol set comprising configurable symbols and non-configurable symbols. In some examples, different symbol sets may be used for different reels; and/or different symbol sets may be used for different instances (in multiple instance implementations).

As used herein, "configurable symbols" are symbols having an associated value in some manner. For example, configurable symbols may have an associated value, which may be direct (in terms of credits, currency, a multiplication factor, etc.) or may be indirect, for example indicating one or more game events, such as a jackpots, or a triggering event (for example, a "wild" symbol that can match with any other symbol; or a feature game triggering symbol, etc.). In many examples, such configurable symbols will have a distinct appearance, and may be modified to change appearance (for example, in response to a "2×" configurable symbol in an instance outcome, a value symbol (for example of 50 credits), may change to 100 credits, and may potentially change in color.

As indicated at 404, in response to the gaming machine 200 determining an individual outcome, for example, by a game processing backend, 314, a UI system 302 of game processing architecture 300 may initiate display the display symbols associated with the outcome. For example, the instance outcome symbols of the multiple reels of a spinning reel game may be displayed in a first region of the display system, as depicted generally, for example, at region 702 of FIG. 7.

As indicated at 406, further in the course of, or in response to, determining an individual instance outcome, the game processing architecture 300 may determine whether the instance outcome includes a multiple option trigger. As discussed further relative to FIG. 5, a gameplay trigger condition (as may be triggered in association with one or more selected forms of configurable symbols, a combination of non-configurable symbols and/or a combination of configurable and non-configurable symbols) triggers an event in the gameplay. In example systems as described herein, the potential gameplay events include one or more multiple option events in which multiple potential prizes may be made eligible for award to the player. In various implementations, the multiple option event, including the determinations as to the awarding of multiple potential prizes is performed automatically in response to the multiple option trigger; in other words, in the absence of any player input after initiation of the instance which resulted in the outcome.

In response to a multiple option trigger event in an initial instance outcome, as indicated at 408, the game processing backend 314 may initiate further gameplay events, including: (1) determining eligible prizes from multiple potential prizes; and (2) for each eligible prize, determining whether the individual eligible prize will be awarded. As with other gameplay events as described herein, the game processing backend 314 can correlate one or more RNG calls from RNG engine 314, through use of the RNG conversion engine 316 referencing one or more lookup tables associated with the multiple option trigger event and/or the potential prizes to make the above determinations.

In some examples, the multiple option trigger event can be triggered by an individual configurable symbol, while in other examples the multiple option trigger event occurs when multiple configurable symbols are present in the instance outcome. In some examples, an individual configurable symbol type (distinguishable, for example, by configuration and/or color) may represent a first multiple option trigger event in response to which eligible prizes may be selected from a first group of potential prizes; while another configurable symbol type, distinguishable as noted above, for example may represent a second multiple option trigger event in response to which either eligible prizes are selected from a second group of potential prizes; or may allow determination of one or more different eligible prizes from the first group of potential prizes. As just one example, a first color (or configuration) of the first configurable symbol may have potential prizes including a plurality of multipliers that may be applied to other awards; while a second color (or configuration) of the second configurable symbol may have potential prizes including a plurality of levels of jackpots. As a result, a prize awarded in accordance with the first configurable symbol could apply a 2× multiplier to a Major jackpot awarded in accordance with the second configurable symbol. Alternatively, in other examples multipliers may be applied to values in the originally determined outcome. For example, a number of credits awarded responsive to the symbols of the outcome may be multiplied in accordance with one or more multipliers determined in response to the multiple option trigger. Further, a first quantity of configurable symbols may correspond to a first multiple option trigger event, while a second quantity of configurable symbols may correspond to a second multiple option trigger event.

Optionally, as indicated at 410, the eligible prizes may be selected from potential prizes and/or awarded in sequence. For example, in an example in which the potential prizes include Minor, Major, and Grand jackpots, a first eligible prize might always be the Minor jackpot, with a second eligible prize being the Major jackpot, etc. For example, a determination may be made (based on an RNG) to select a first eligible prize from the Minor, Major, and Grand jackpots. After the first determination is made, a second determination may be made to select a second eligible prize that is next in sequence to the first selected eligible prize. For example, if the first eligible prize that is selected is the Major jackpot, then the second eligible prize is only the Grand jackpot. Thus, a multiple option trigger condition can initiate determining any of multiple prizes to be awarded from multiple hierarchical tiers of prizes, or from a subset of the multiple hierarchical tiers of prizes.

In other examples, for example in an implementation in which the potential prizes include a series of multipliers (2×, 3×, 4×, 5×, 6×), multiple prizes might be awarded in numerical series, but the starting point of the series may be randomly selected in the sequence (for example starting at 4×, rather than at the initial 2× potential prize). In other examples, a single eligible prize might be selected from any one of the three jackpots; and as indicated at 412 an eligible prize may optionally be selected from any one of the three jackpots and any combination of the jackpots (i.e. the potential prizes include six options including the identified three jackpots: Minor; Major; Grand; as well as combinations of the jackpots: Minor-Major; Minor-Grand; Major-Grand). As a result, hierarchical awarding of prizes from the multiple tiers may always start at a lowermost level of the hierarchy; or in other embodiments may start at a level above the lowermost level.

In examples in which the instance outcome is a portion of a feature game, additional prizes may include, for example, respective numbers of free spins (which might include additional row or columns of the matrix; and/or an enhanced symbol set); or respective numbers of additional games to play in parallel (for example a match 3 game, or another game, which may in some cases implement a different game mechanic than the feature game), etc. In other examples, the prizes in different hierarchical tiers may be different from one another. For example, a first tier might contain multiplier values, while another tier includes free spins; and a further tier includes jackpots, as discussed above.

As indicated at 414, determination of eligible prizes may also serve as a graphic trigger condition resulting in modification of a metamorphic graphic image, for example as may be configured to display an image and/or animation identifying to a player the eligible prizes; before the second determination of which if any eligible prizes will be awarded (or at least before displayed to the player of the awarded eligible prizes). In some embodiments, as discussed in more detail in reference to FIGS. 6, 7 and 8), images, including a metamorphic graphic image, may be displayed in a second region of the display system; for example, such a second region of the display system may be located above the first region containing the spinning reel matrix of the instance outcome, either on a separate display screen, or in an upper portion of a single display screen (as depicted in, and discussed relative to, FIG. 1).

Such metamorphic graphic elements can be directly metamorphic, in which a change in form is in direct proportion to a game value or characteristic (for example, the value of a jackpot, or likelihood of triggering the corresponding prize). For example, displayed coins in a bowl might increase in direct proportion to credits awarded during the gameplay, is direct proportion to the incremented value of a jackpot, or reflect the probability of occurrence of a bonus trigger that may award a value associated with the bowl. Other metamorphic elements can be pseudo-metamorphic, in which a change in form is not necessarily in direct proportion to gameplay or other events. The term "metamorphic" is used herein generically to refer to both direct and pseudo-metamorphic elements/events.

Though many forms of images may be used, with a wide variety of themes, the present description addresses controlling a display system to present a graphic presentation on the EGM that includes distinct graphic elements (which may be incorporated into or associated with additional graphic images): movable graphic objects, which move to, and between, multiple graphic destinations. In some example embodiments, the movable graphic objects may depict individual items associated with some value (such as coins, gemstones, pearls, etc.), or may depict movable graphic objects consistent with a presented theme of the game. The presentation of selected events through movement of movable graphic elements to and between graphic destinations can serve to better communicate to a player the significance of events occurring during the gameplay.

In the example embodiments discussed herein, though the metamorphic images may vary broadly as to the images displayed. As indicated in 416, optionally, the metamorphic image, when present, may include several features including at least one movable graphic object; and multiple graphic destinations to which the graphic object may move. The term "movable graphic object" is used herein to refer to an image of an object/structure which is independently movable relative to other image elements, and in particular relative to the multiple graphic destinations. In some examples, the movable graphic object may be of an item having or suggesting value, for example a coin, diamond or other gemstone, pearl, paper currency, etc.; or may be an item that may be collected as part of the theme of a game (such as nuts, acorns, fish, etc. for a nature-theme game).

The multiple "graphic destinations" represent images of locations at which the movable graphic object(s) may make contact and/or come to rest. For example, in the above case of the potential prizes including Minor, Major, and Grand jackpots, the metamorphic image may include graphic destinations for each of those jackpots/potential prizes, as described in more detail relative to FIGS. 6, 7, and 8. For example, the multiple graphic destinations may depict collection locations for the movable graphic object(s). In many examples, the multiple graphic destinations will include at least three such graphic destinations. In one example, when potential prizes (associated with respective graphic destinations) are selected as eligible prizes, one or more graphic elements may move to and/or be collected at each of the graphic destinations associated with eligible prizes.

As indicated at 418, in response to determining that one or more eligible prizes are to be awarded in response to the multiple option trigger, the gameplay backend system 314, will control the UI system 302 to further display an indication of the one or more eligible prizes awarded.

Figure 6:
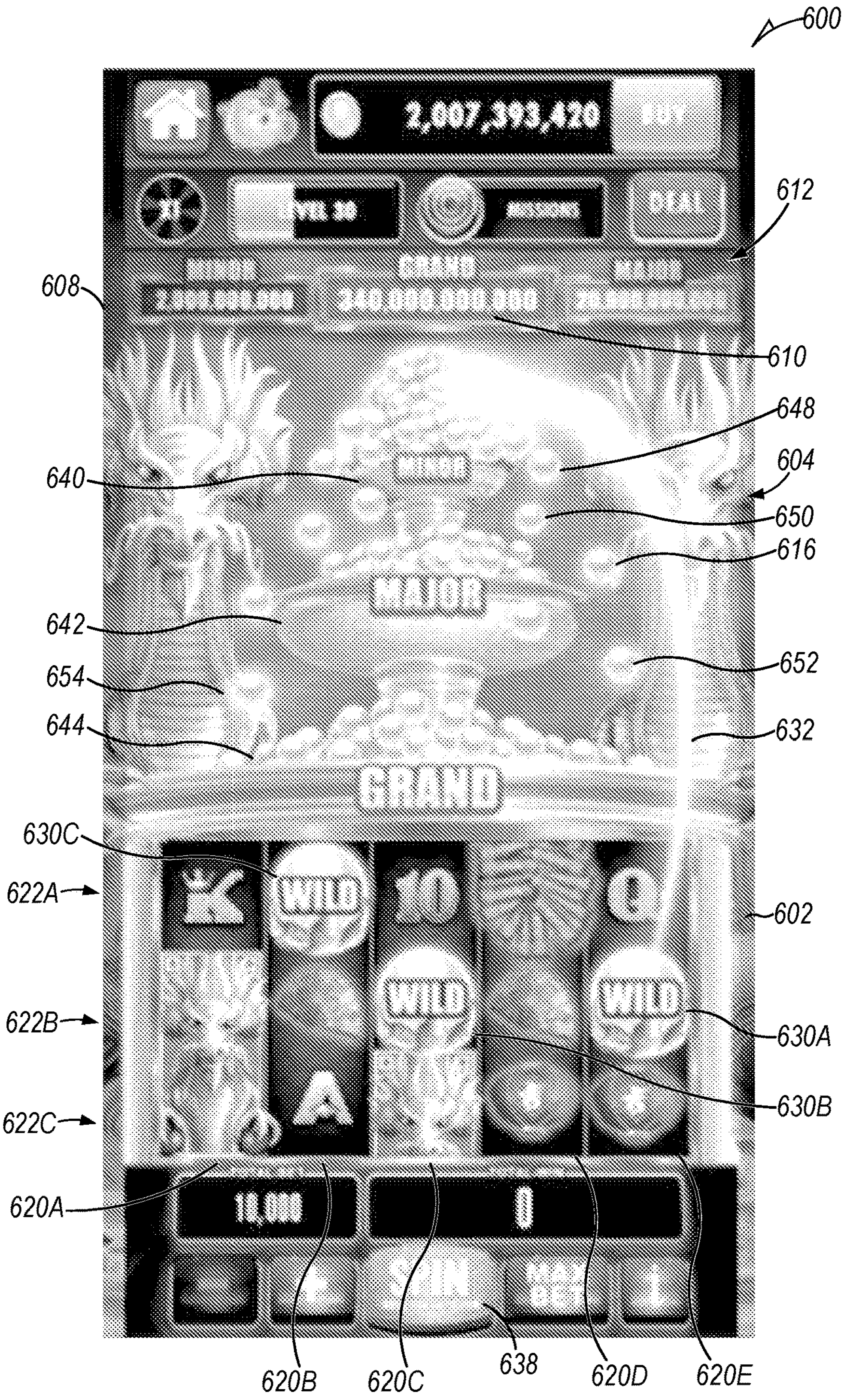
FIG. 6 depicts an example display screen as may be presented in accordance with the example process of FIG. 4.
Figure 7:
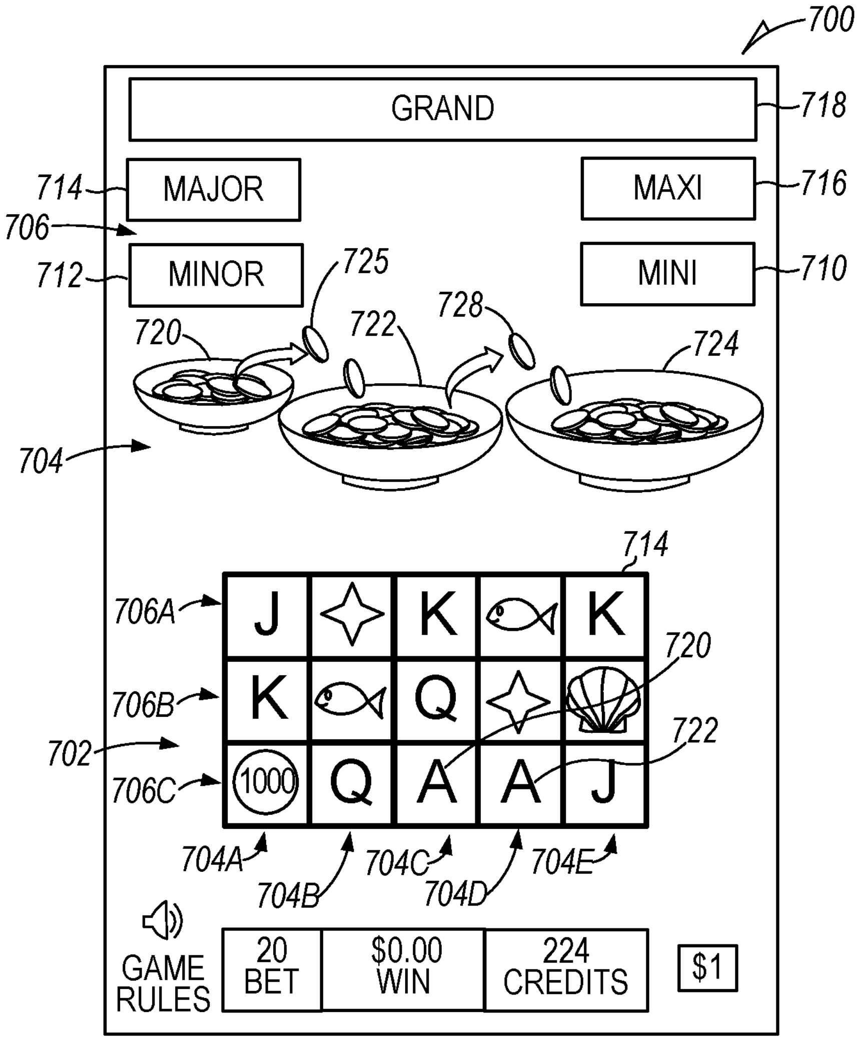
FIG. 7 depicts a further example display screen as may be presented in accordance with the example process of FIG. 4.
Figure 8:
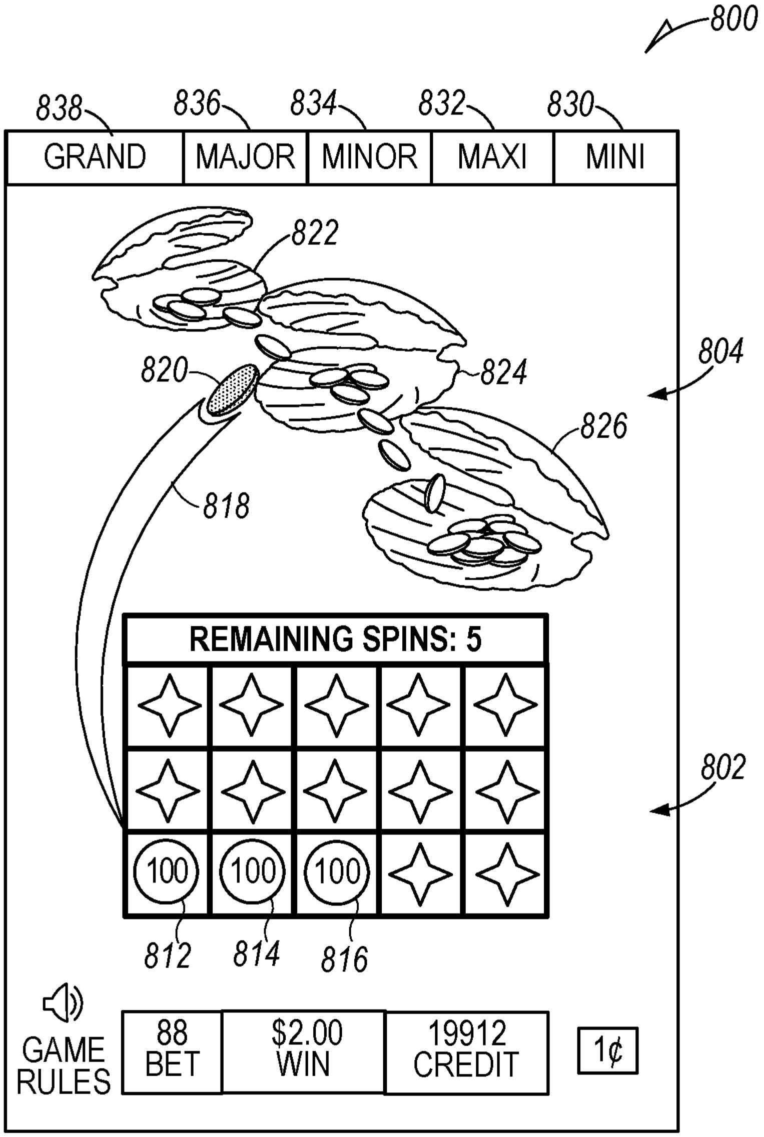
FIG. 8 depicts a further example display screen as may be presented in accordance with the example process of FIG. 4

Examples of multiple graphic destinations are discussed in more detail in reference to FIGS. 6, 7, and 8, but may include, for example bowls, shelves, shells, as well as many other potentially depicted structures, etc. In selected examples, the multiple graphic destinations will be displayed in relation to one another in a manner to depict a progressive path from one graphic destination to another. In examples in which eligible prizes are awarded sequentially from a series of potential prizes, one or more graphic objects may traverse a progressive path to the graphic destination associated with selected eligible prize(s). Examples of progressive paths are depicted herein. FIG. 6 depicts a fountain configuration with multiple three trays of increasing dimension in a downward direction; FIG. 7 depicts an arrangement of multiple bowls of increasing size; and FIG. 8 depicts a diagonally cascaded arrangement of three shells of increasing size. In some examples, the multiple graphic destinations can be of identical sizes; though the presentation of graphic destinations of increasing size may be used to indicate increasing value to a player has movable graphic objects collect in the relatively downstream graphic destinations. As a result, such metamorphic graphic elements can visually instruct the player as to the tiers of prizes, and potential awards that may be made, or are made; which may be of particular value to the player as the determinations as to the multiple option trigger condition are made without the need for a further player input. In conventional games, the player typically has a role in taking actions which result in an RNG-based determination in the gaming system. With the multiple option trigger conditions as described herein, and the hierarchical prizes, the various determinations that may be made, as described above, may be less apparent to the player due to the absence of player input during determinations made responsive to the multiple option trigger condition.

As an example solution to this problem, in response to determining that a graphic trigger condition is met for an instance outcome, processing architecture 300 can control the applicable UI, to display a movable graphic object; which will commonly be displayed in motion, and the movable graphic object may move from a first or original position to one of the depicted graphic destinations. As identified above, in some implementations, one or more movable graphic objects may always move to a first graphic destination (for example, when prizes associated with the individual destinations are awarded sequentially). Examples are discussed below in reference to FIGS. 6, 7 and 8.

Figure 5:
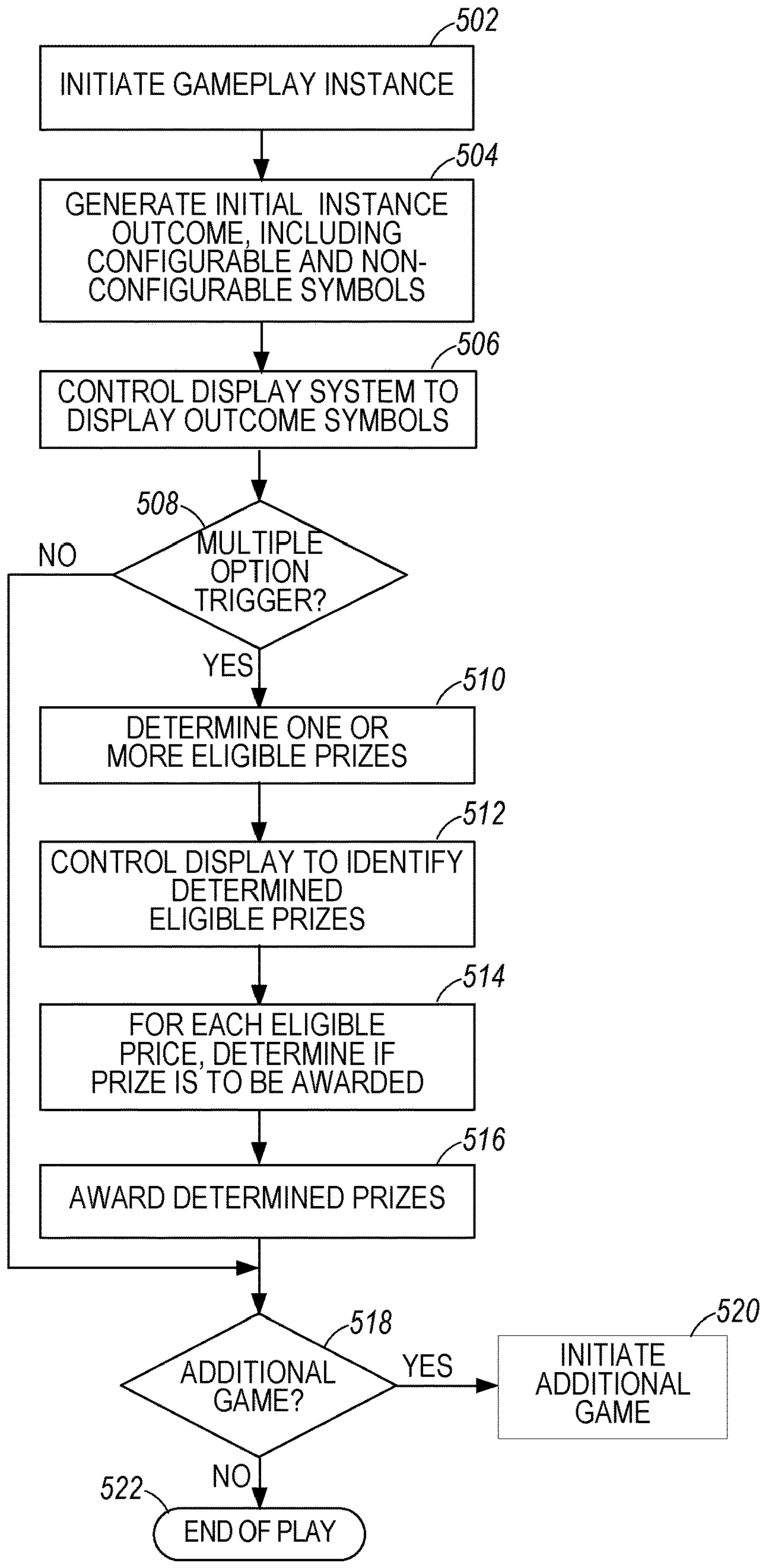
FIG. 5, depicts an example process flow for the process of FIG. 4.

Referring now to FIG. 5, the figure depicts an example process flow 500 for implementing an example gameplay process as discussed in reference to FIG. 4. At 502, a gameplay instance will be initiated (again either as a base game or as part of a feature game). As indicated at 504, an instance outcome will be generated; which in the example of the spinning reels game will result in display of a matrix of symbols. The generated instance outcome is complete as to the symbols of the outcome; however, as the presence of a multiple option trigger will result in additional determinations, and potential prize awards, for purposes of the present description, purely for purposes of clarity, the term "initial instance outcome" is used herein to describe the displayed symbol outcome before, or at least independent from, a "final instance outcome" achieved in response to a multiple option trigger in the initial instance outcome. In gameplay processes the "instance outcome" includes all awards generated as a result of the initiated gameplay (as a result of a single spin of the reels in a spinning reel game). However, in the gameplay as described herein, an initial instance outcome that includes a multiple option trigger results in multiple additional determinations, and potentially additional awards, before the instance is concluded. Thus, the term "final instance outcome" is used in the present description, solely for clarity. As indicated at 506 the game processing architecture, such as example 300, will control the appropriate game play UI (304, 308, 312) to display the outcome symbols. See, for example, the display scheme representation of FIG. 6, in which a matrix of the outcome symbols including both configurable and non-configurable symbols are displayed in a lower region 602, and a metamorphic image including multiple movable graphic objects (depicted as pearls, for example, as indicated at 616), which is displayed in a relatively upper region 604. As is familiar, the outcome symbols are displayed in a matrix of multiple columns 620A-620E, in multiple rows 622A-622C.

With the generation of the initial instance outcome, a determination will be made, at 508, whether the instance outcome includes one or more multiple option triggers, as previously discussed in reference to FIG. 4. In the event that one or more multiple option triggers exist, then at 510, the game architecture 300 will determine any eligible prizes from multiple potential prizes, in response to each of the one or more multiple option triggers. As discussed previously, the eligible prizes may be determined through one or more RNG calls to an RNG conversion engine to determine the prizes eligible for award.

In some configurations, prizes may be awarded sequentially through the hierarchy of prizes, through any of multiple implementations. In one example implementation of such sequential prizes, using the three jackpot example discussed above, through a first RNG call and a first lookup table, a determination is made as to how many of the sequential potential prizes will be eligible. In such an implementation, if the determination is made that the Minor and Major jackpots are eligible, then separate RNG calls may be made to determine if each of the Minor and Major jackpots will be awarded. In other example implementations of sequential prizes, in the event of the multiple option trigger, then each of the hierarchical prizes will be considered eligible, and separate RNG calls may be made to determine whether each of the sequential potential prizes will be awarded.

In various examples, a game/bonus presentation may be presented via the user interface corresponding to each of the eligible sequential prizes. For example, a wheel spin, a pick three selection, etc. may be presented to a player to visually present to the player the outcome of the RNG call that determines whether that sequential potential prize is to be awarded.

In other examples, a random determination of the eligible prizes from the potential prizes may be made in response to a one or more RNG calls referenced to one (or more) lookup tables containing weighted values in RNG conversion engine 316. In some configurations, different symbols may be associated with one or more potential prizes, and such a symbol in an instance outcome may serve not only as a multiple option trigger but also as a determination of eligible prizes. For example, a specified configurable symbol in an outcome might automatically make any of multiple options (as an example, Minor, Major, and Grand jackpots) eligible for award. In some examples of such an implementation, different symbols may be associated with different eligible prizes. In some cases, the different symbols will be visibly distinguishable to a player; but in other examples the different symbols may be displayed uniformly, thereby adding further interest to a player as to what options, and what eligible prizes, will be associated with a displayed symbol, since the associated options and/or prizes are variable at least relative to the appearance displayed to the player.

In many examples, the eligible prizes will be identified to a player, as indicated at 512. As discussed above, in some implementations, the eligible prizes may be identified at least in part through use of a metamorphic graphic, as discussed below. Example process flow 500 further includes, for each eligible prize, determining if the prize is to be awarded, as indicated at 514, and then awarding the prizes, as indicated in 516, which in many examples will include controlling the display system to indicate the award(s), and which may include further include changing of a metamorphic graphic image.

The above-described example process may be modified in other implementations. For example, the determining of one or more eligible prizes 510, and determining for each eligible prize at the prizes to be awarded 514 may be combined a single operation of identifying a prize or combination of prizes which will be awarded. An example is described in more detail in reference to FIG. 6. Similarly, controlling the display to identify eligible prizes 512 may occur after, for example, determining the prizes to be awarded. So the order or manner of presentation on a display can be distinct from the order in which determinations are made as to which prizes are eligible for award and/or which prizes will be awarded.

After the instances complete, the determination will be made as to whether there is an additional game (or game instance). For example, if the completed instance is a base game, a player may elect to play another base game. In other examples if the completed instance is one of a multiple instance feature game, then additional instances may remain to be played (which includes the possibility that additional instances are awarded as part of the instance outcome at 504, or as part of the subsequently awarded prize(s) determined at 514).

Addressing the potential use of a metamorphic graphic image, any of the above-described operations in process flow 500 may also serve as a graphic trigger for a metamorphic graphic image. As used herein, the term "graphic trigger" (or "graphic trigger event") refers to a determination or condition selected to result in initiation and/or movement of a portion of a metamorphic graphic image. In selected examples, the metamorphic graphic image may include movement of one or more movable graphic object relative to specified locations. The game processing backend system 314 may similarly establish conditions that when present represent a graphic trigger event for one or more movable graphic objects.

As discussed previously, graphic trigger events present in an individual game outcome may be determined through reference to a lookup table or other data structure stored in memory of, or accessible to, a game controller 210. In some examples a game instance outcome may be compared to the data structure to determine: whether a player award trigger in a game outcome represents a graphic trigger; and in the event of a graphic trigger, the graphic event associated with the trigger. As noted previously, selection of a graphic event to be displayed in response to a graphic trigger may be performed through use of call to an RNG; or may reflect a determination, for example as to an eligible prize, which was made through a RNG call.

In the example of FIG. 6, at least a first multiple option trigger condition exists by virtue of multiple "wild" configurable symbols, including two "wild" symbols on a single line. In various examples, the presence of the wild symbol anywhere in the matrix may constitute a trigger condition. In various examples, where the slot game is a ReelPower game, then the presence of the wild symbol in consecutive columns may be required to trigger separate multiple option triggers. For purposes of the present discussion, each depicted "wild" symbol will be treated as a separate multiple option trigger; and additionally each multiple option trigger condition also serves as a graphic trigger condition. However, instead of, or in addition to, each "wild" symbol serving as a respective multiple option trigger condition, the existence of a multiple option trigger condition may be established by a combination of "wild" symbols in the outcome (for example either of: the two "wild" symbols on a single line, or the three wild symbols (either in any position, or in consecutive columns, as depicted).

In many embodiments, evaluations will be made from left to right across the reel matrix, for example, for "wild" symbol 630A, then for "wild" symbol 630B, and finally to "wild" symbol 630C. The present example will address the multiple option trigger and a graphic trigger in reference to "wild" symbol 630C. In example implementations of a game procedures may have been performed previously relative to "wild" symbols 630A and 630B to the left of the discussed symbol. In an example in which each "wild" symbol represents an individual multiple option trigger, then in a first example implementation, which may provide for awards to be determined sequentially, the presence of "wild" symbol 630C in the outcome a first determination based on an RNG call may be made to determine if a first award of multiple possible awards, for example a Minor jackpot (graphically represented at 640), will be awarded. In other examples, in which the award is not an established value (for example a multiplier value), then determination of a first award may be implemented through two determinations: (1) whether a first level award will be awarded; and (2) a value (2×, 3×, etc.) of the award.

As described herein, in response to a multiple option trigger, determinations will be made as to which if any prizes may be awarded from multiple potential prizes. Additionally, in selected embodiments the multiple prizes will include one or more prizes from each of multiple tiers; which in some examples may be hierarchical, for example a relatively lower value, a relatively intermediate value, and a higher value. In some examples, awarding of an intermediate or higher tier may be contingent on awarding of a lower tier; or alternatively, making be contingent on not awarding of a lower tier.

As identified earlier herein, FIG. 6 depicts an inherently hierarchical representation of a "jackpot fountain," with each of three cascading trays of the fountain having increasing size, and associated with associated with respective increasing jackpots, from a lowermost value tier 640 (physically at the top of the fountain) associated with a Minor jackpot, to an intermediate value tier 642 associated with a Major jackpot, and an uppermost value tier (physically at the bottom of the fountain) associated with a Grand jackpot 644. The use of three hierarchical tiers of increasing value is merely an example, and other embodiments may use three or more hierarchical tiers.

An example implementation of selecting between multiple tiers of awards, such as those in FIG. 6, may provide for multiple (or all) of the hierarchical tiers being eligible for award. In selected embodiments of such an example, separate RNG calls for each tier may be correlated with a weighted table to make independent determinations per tier (in the present example, Minor, Major, and Grand jackpots).

| | |
|---|---|
| Minor Jackpot | Award? yes/no |
| Major Jackpot | Award? yes/no |
| Grand Jackpot | Award? yes/no |

In other examples, independent determinations may also be provided for combinations of tiers of prizes: Minor and Major Jackpots; Minor and Grand jackpots; Minor, Major, and Grand jackpots; and Major and Grand jackpots; and thus options for each combination would be included.

In an example implementation, a second determination may automatically be made as to whether a second award of the multiple possible award will be awarded. In implementations in which the awards are addressed sequentially, the second determination may be made as to the next (second) sequential award, in this example the Major jackpot (graphically represented at 642). In some implementations, the determinations as to each award may be made independent of any other awards. In other implementations, determinations of a relatively upper tier award, such as determination as to the Major jackpot, may be contingent upon either: a determination to award of the Minor jackpot; or a determination not to award the Minor jackpot. In some implementations, an additional determination may be made as to a subsequent (third) sequential award, such as the Grand jackpot (graphically represented at 644); and again a determination as to the Grand jackpot may be contingent upon determinations either to award or to not award a lower tier/value award.

In this example, in which each "wild" symbol represents an individual multiple option trigger, and in which the awards are addressed sequentially, then the above determinations may be repeated for "wild" symbol 630B; and then again for Wild symbol 630C in the example outcome of FIG. 6.

While the weighted tables for the above determinations will be established to provide a selected RTP over time, the independent volatility for each prize may result in the selected RTP being achieved over an undesirably long time period, and/or may complicate compliance with mandated requirements. Such problems of volatility and RTP may be further complicated when the prizes include values, such as community jackpots, which are established external to the individual gaming machine. These problems can be overcome though alternative methods of determining which if any of multiple prize options will be awarded. In a first alternative method, prizes will be selected through a configuration of data structure, such as a unified weighted table which includes all possible prizes, wherein a determination may be made through use of a single RNG call. With such an example, a result of the RNG call with the data structure which establishes probabilities of awarding each prize of a plurality of tiers of the multiple hierarchical tiers of prizes.

| Tiers | Relative Counts (%) |
|---|---|
| Tier 1 | 40 |
| Tiers 1 and 2 | 12 |
| Tiers 1, 2, and 3 | 3 |
| Tier 2 | 20 |
| Tiers 2 and 3 | 10 |
| Tier 3 | 15 |

In some implementations the RNG call which determines the above prizes through use of the weighted table will also determine that the prize will be awarded. In other examples, a determination through use of the above table may establish which tiers of prizes are eligible for award; and a separate determination may be made (for example a Win/No Win determination), as to whether the eligible prize tier(s) will be awarded to the player. The Win/No Win determination may use a separate weighted table (so that it is not a 50/50 determination). Further, the win/no win determination for each jackpot may use a different weighted table.

In an alternative method, the weighted table to determine the eligible jackpot may be structured in two tiers. A first weighted table may determine the starting tier or level, such as tier 1, tier 2 or tier 3. A second, linked weighted table, may be used to determine, based on the starting tier, whether the next tier is going to be eligible or not. For example, the second weighted table may be provided for each of the three starting tiers in this example. A second weighted table for tier 1 may be used to determine whether the tier 2 award is going to be eligible or not. It may also be used to determine whether the tier 3 award is eligible or not, if the tier 2 award is found to be eligible.

As noted previously, different symbols and/or combinations of symbols may result in different multiple option triggers. For example, the above discussion provides determination examples in response to a first multiple option trigger resulting from "Wild" symbol 630A. In another example, "Wild" symbol 630C, in another row of the displayed outcome may result in a second multiple option trigger different from that described above. For example, the second multiple option trigger may result in a determination relative to a second data structure, for example a second unified weighted table of a different group of potential prizes and percentages. For example, the second unified weighted table might present only prizes of tier 2, tier 3, and the combination of tiers 2 and 3. In some examples, the difference in the starting point in the hierarchy may be indicated by the movement of a graphic object to an intermediate location in the hierarchy (see for example, FIG. 8 discussed below).

In yet another alternative method, as noted above one or more of the tiers may include multiple potential prizes (particularly, wherein the prizes not a separately established jackpot value as in the example above). For example, tier 1 may offer a multiplication factor of either 2× or 3×; while tier 2 may offer a multiplication factor of 4× or 6×. In some implementations, after use of a unified weighted table, such as that above, determining that tier 1 is either eligible, or will be awarded, then a separate determination, through a separate RNG call, may be made to select the multiplication factor (from 2× or 3×) from the multiple options within the tier.

In another alternative method, where one or more tiers includes multiple options, the unified weighted table may be adapted to include reflect each potential prize for each tier—for example, as to tier 1, the above table might reflect:

| | |
|---|---|
| Tier 1-2X | 26 |
| Tier 1-3X | 14 |

The options for additional tiers would be adapted in a similar manner. These multiple options of differing value within a tier may be considered as additional levels within the hierarchy of awards.

As noted above, each multiple option trigger condition may also serve as a graphic trigger condition initiating depiction of a graphic representation conveying the above multiple possible awards and the results of the determinations regarding each award to a player. This both assists in communicating the gameplay, which is particularly useful for implementations in which no user input is required to initiate the above determinations; and also in providing enhanced interest in the game for the player In the example of FIG. 6 the depicted animation includes a first graphic object (here in the form of a pearl 632) arising from "wild" symbol 630A, leaving a trail from symbol 630A, and moving to a first graphic object destination at the uppermost, receiving level of the depicted "jackpot fountain" as discussed above. In the depicted example, each of the three trays 640, 642 and 644 may represent a potential award. Values attributed to each of these jackpots are also depicted on the display screen at 608, 610, and 612. The described animation may be used to depict that the Minor jackpot associated with tray 640 is an initial eligible prize based upon wild symbol 630A, both by movement of one or more pearls 632, and enhanced illumination of tray 640. In example game plays, such as that discussed above, movement of additional graphic objects (here, pearls) from tray 640 to tray 642, and ultimately to tray 644, may be used to communicate the above determinations as to eligibility—or award—of the jackpots associated with such trays. Eligible awards based upon wild symbols 630B and 630C, may be represented in an analogous manner.

In implementations in which each wild configurable symbol represents an independent multiple option trigger, the each "wild" configurable symbol may represent an additional graphic trigger, and result in controlling the display to initiate display and movement of additional moving graphic objects in accordance with, for example, eligible awards responsive to those respective trigger conditions.

As discussed previously herein, initiation and movement of movable graphic objects can be performed through reference to data structures stored in memory accessible for example, to either the game controller or a UI system. Such data structures may include 2D or 3D bitmaps of objects, and for example center point coordinates which may be displayed in a desired animation; or in other examples the data structure may define properties and characteristics of the movable graphic objects in accordance with a selected API to facilitate rendering of the movable graphic objects. In some examples, in order to minimize processing overhead, in embodiments in which the movable graphic objects are rendered, due to the possibly relative static nature of the graphic destinations, those may commonly be represented by a bit map.

As will be apparent from the above discussion, an initial instance outcome may include a plurality of multiple option triggers, and therefore a similar plurality of graphic triggers. In such a case, the game processing architecture may maintain a hierarchical ordering in which the plurality of multiple option triggers will be processed to determine eligible prizes and/or to award randomly selected eligible prizes; and in some examples the same, or an analogous, hierarchical ordering may be used in initiation and/or movement of movable graphic objects. For example, a first graphic trigger may result in initiation and movement of a single movable graphic object; while a second graphic trigger may result in initiation and movement of multiple (for example, five) movable graphic objects. In such an implementation, the graphic events resulting from the graphic triggers may be presented in order of increasing "value" attributed to the multiple option triggers and/or eligible prizes determined in response to those triggers.

Referring now to FIG. 7, the figure depicts an example display screen of a display system. In the depicted example, each graphic destination is represented as a bowl (which in this example increase sequentially in size), and the movable graphic objects are represented as coins (or chips or tokens). In contrast to the example of FIG. 7, the depicted graphic destinations are not tied to relative jackpots (Mini 710, Minor 712, Major 714, Maxi 716, and Grand 718), as displayed in a third region 706 of display 700. To the extent that the graphic destinations are tied to gameplay events, they may be tied to any selected event, for example: progress toward earning a bonus game; progress toward earning an enhanced feature in the current game (for example a value multiplier); or reflecting accumulated credits. In selected examples, change of the metamorphic graphic image may be associated with gameplay events other than one or more multiple option triggers. For example, in the example of FIG. 7, the symbol matrix displayed in first region 702 of the display screen displays an example configuration in which the instance outcome includes two aces ("A") 720, 722 on adjacent reels 704C, 704D, in row 706C. In some game configurations two matching symbols, might not represent an award trigger condition, but in the depicted example, may represent a graphic trigger condition, as depicted.

For example, as depicted in FIG. 7, movable graphic object 725 is depicted moving from the first bowl 720 to the second bowl 722 and movable graphic object 728 is depicted moving from second bowl 722 to the third bowl 724).

Referring now to FIG. 8, the figure depicts a view of an alternative display screen configuration as may be presented in a further embodiment. In display screen 800 of FIG. 8, a first game instance outcome is displayed with a symbol matrix depicted in a first region 802. In a second region of display screens 800, three graphic destinations are depicted in the form of three shells 822, 824, 826 arranged in a diagonal/cascading orientation. In the example, while the jackpots are displayed on display screen 800 (Mini 830, Minor 832, Major 834, Maxi 836, and Grand 838), the jackpots are not expressly associated with the graphic destinations represented by shells 822, 824, 826.

The displayed instance outcome includes three matching configurable symbols 812, 814, 816, which, for purposes of the present example will represent a multi-option trigger event. As discussed in reference to FIG. 4, eligible prizes may be determined in a random order, or may be determined in a sequential order but starting at a selected location in a sequence. Consistent with such an implementation, the display may be configured to indicate to a player that a multi-option triggers results in an eligible prize starting at an intermediate level of the hierarchy, by moving the movable graphic element to an advanced position within the multiple graphic destinations—here moving a new movable graphic element 820 along path 818 to the second-in-sequence shell 824. Additionally, and alternatively, selected other multiple option triggers may result initiating a movable graphic element 820, having a different color (indicated in the example by lines), relative to other depicted movable graphic symbols.

In certain embodiments, each of the symbol positions the feature game matrix may be associated with an individual reel, with each reel a reel strip. Some of the reel strips may be common with other reels, or each reel may have a unique reel strip.

Those of ordinary skill in the art having the benefit of this disclosure will appreciate that a wide variety variations may be adopted in combination with the teachings of the present disclosure; such as, for example: (1) the number of symbols required to trigger the multiple option award; (2) the number of prizes awarded; (3) the number of symbols that have to be displayed to win a prize or jackpot in the base game or a feature game; (4) the prize value of any configurable symbols; Additionally, unless identified otherwise, any determination or variable described or contemplated in the present disclosure may at least in part be (a) randomly determined; (b) predetermined; (c) determined based on a wager amount and/or level; (d) centrally determined; (e) determined based on a generated symbol or symbol combinations; (f) determined based on player selection; (g) determined based on player skill; (h) determined based on a side wager or ante bet; (i) determined based on a status of the player; (j) determined as a combination of two or more determinations disclosed herein; etc.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A gaming system, comprising:

a display device;

a processor; and a memory storing instructions thereon, wherein the instructions when executed by the processor, cause the processor to:

cause the display device to display a matrix defining a plurality of symbol positions and a metamorphic graphic image, the metamorphic graphic image including a plurality of graphic destinations and a movable graphic object, each graphic destination of the plurality of graphic destinations identifying a corresponding award tier of a plurality of award tiers;

cause the display device to display an initial game outcome, the initial game outcome including a plurality of symbols and a graphic trigger displayed in the matrix, the graphic trigger including a configurable symbol in a first symbol position of the matrix;

perform a lookup within a single data structure stored in the memory using an output of a random number generator, the single data structure including a unified weighted table including a first column and a second column, the first column listing the eligible award tiers from the plurality of award tiers, the second column listing a plurality of weighted probabilities, wherein the first column includes a first entry listing a first award tier, a second entry listing a second award tier, and a third entry listing both the first award tier and the second award tier;

determine, based on the lookup identifying the third entry, that both the first award tier and the second award tier are eligible to be awarded; and in response to the graphic trigger in the initial game outcome and the determination that the first award tier and the second award tier are eligible:

cause the display device to indicate that the first award tier is eligible by displaying the movable graphic object moving from the first symbol position on the display device to a first graphic destination of the plurality of graphic destinations on the display device; and cause the display device to indicate that the second award tier is eligible by displaying at least one of the movable graphic object and an additional movable graphic object moving to a second graphic destination of the plurality of graphic destinations.

2. The gaming system of claim 1, wherein the second award tier has a higher value than the first award tier.

3. The gaming system of claim 2, wherein the plurality of graphic destinations further include a third graphic destination identifying a third award tier having a higher value than the second award tier, and wherein the instructions, when executed by the processor, further cause the processor to:

cause display of the movable graphic object moving on the display device from the second graphic destination and landing at the third graphic destination, wherein the landing of the movable graphic object at the third graphic destination indicates that the third award tier is eligible.

4. The gaming system of claim 1, wherein each graphic destination of the plurality of graphic destinations identifies a corresponding jackpot of a hierarchical tier of jackpots.

5. The gaming system of claim 1, wherein the configurable includes a WILD symbol landing in the first symbol position of the matrix for the initial game outcome.

6. The gaming system of claim 1, wherein the memory stores a graphics data structure defining display properties of movements of the movable graphic object, wherein the instructions, when executed by the processor, further cause the processor to control display of the movable graphic object based on a lookup of the graphics data structure.

7. The gaming system of claim 1, wherein the instructions, when executed by the processor, further cause the processor to:

cause display, in response to an additional graphic trigger in the initial game outcome, of a plurality of additional movable graphic object moving on the display device and landing at at least one of the graphic destinations.

8. The gaming system of claim 7, wherein the instructions, when executed by the processor, further cause the processor to:

determine, for each movable graphic object, a final graphics destination in which the associated movable graphic object will land, wherein each graphics destination of the plurality of graphics destinations are grouped into a hierarchical tier of a plurality of hierarchical tiers; and cause display of moving each movable graphic object in an order based on the hierarchical tier of the final graphics destination for each movable graphic object.

9. The gaming system of claim 1, wherein the plurality of graphic destinations are each displayed in relation to one another to depict a progressive path between the graphic destinations.

10. The gaming system of claim 1, wherein the movable graphic object is a pearl and each graphic destination is a different tray of a fountain.

11. The gaming system of claim 1, wherein each graphic destination identifies a game play event, the game play event including at least one of: progress toward caring a bonus game and progress toward earning a multiplier feature.

12. A method of implementing a game comprising:
displaying, on a first region of a display, a matrix defining a plurality of symbol positions;
displaying, on a second region of the display, a metamorphic graphic image, the metamorphic graphic image including a plurality of graphic destinations, each graphic destination of the plurality of graphic destinations identifying a corresponding award tier of a plurality of award tiers;
displaying an initial game outcome in the first region of the display, the initial game outcome including a plurality of symbols and a graphic trigger displayed in the matrix, the graphic trigger including a configurable symbol in a first symbol position of the matrix;
performing a lookup within a single data structure using an output of a random number generator, the single data structure including a unified weighted table including a first column and a second column, the first column listing eligible award tiers from the plurality of award tiers, the second column listing a plurality of weighted probabilities, wherein the first column includes a first entry listing a first award tier, a second entry listing a second award tier, and a third entry listing both the first award tier and the second award tier;
determining, based on the lookup identifying the third entry, that both the first award tier and the second award tier are eligible to be awarded; and
in response to the graphic trigger in the initial game outcome and the determination that the first award tier and the second award tier are eligible:
indicting that the first award tier is eligible by moving a movable graphic object on the display from the first symbol position on the display to a first graphic destination of the plurality of graphic destinations; and
indicating that the second award tier is eligible by moving at least one of the movable graphic object and an additional movable graphic object to a second graphic destination of the plurality of graphic destinations.

13. The method of claim 12, wherein the second award tier has a higher value than the first award tier.

14. The method of claim 13, wherein the plurality of graphic destinations further include a third graphic destination identifying a third award tier having a higher value than the second award tier, the method further comprising:
moving the movable graphic object on the display from the second graphic destination and landing at the third graphic destination, wherein the landing of the movable graphic object in the third graphic destination indicates that the third award tier is eligible responsive to the initial game outcome.

15. The method of claim 12 further comprising:
displaying, in response to an additional graphic trigger in the initial game outcome, a plurality of additional movable graphic objects on the display;
determining, for each movable graphic object, a final graphics destination in which the associated movable graphic object will land, wherein each graphics destination of the plurality of graphics destinations are grouped into a hierarchical tier of a plurality of hierarchical tiers; and
move each movable graphic object according to an order based on the hierarchical tier of the final graphics destination for each movable graphic object.

16. A non-transitory computer-readable media containing instructions embodied thereon which, when executed by a processor, cause the processor to:
cause display of a plurality of symbol positions in a first region of a display and a metamorphic graphic image in a second region of the display, the metamorphic graphic image including a plurality of graphic destinations, each graphic destination of the plurality of graphic destinations associated with a corresponding award tier of a plurality of hierarchical award tiers;
populate the plurality of symbol positions with a plurality of symbols for an initial game outcome, the initial game outcome including a graphic trigger including a configurable symbol in a first symbol position of the plurality of symbol positions;
perform a lookup within a single data structure using an output of a random number generator, the single data structure including a unified weighted table including a first column and a second column, the first column listing eligible award tiers from the plurality of award tiers, the second column listing a plurality of weighted probabilities, wherein the first column includes a first entry listing a first award tier, a second entry listing a second award tier, and a third entry listing both the first award tier and the second award tier;
determine, based on the lookup identifying the third entry, that both the first award tier and the second award tier are eligible to be awarded; and
in response to the graphic trigger in the initial game outcome and the determination that the first award tier and the second award tier are eligible;
cause the display to indicate that the first award tier is eligible by displaying a movable graphic object moving on the display from the first symbol position on the display to a first graphic destination of the plurality of graphic destinations on the display; and
causer the display to indicate that the second award tier is eligible by displaying at least one of the movable graphic object and an additional movable graphic object moving to a second graphic destination of the plurality of graphic destinations.

17. The non-transitory computer-readable media of claim 16, wherein the second award tier has a higher value than the first award tier.

* * * * *